April 1, 1947.  C. D. AUSTIN  2,418,286
ARTIST'S SKETCHING EQUIPMENT
Filed Feb. 21, 1945  2 Sheets-Sheet 1
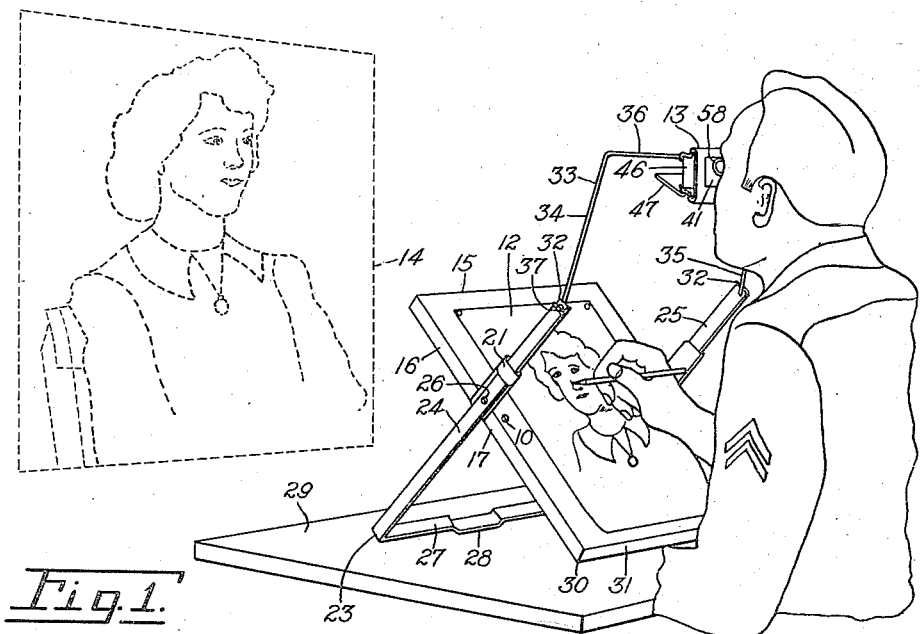
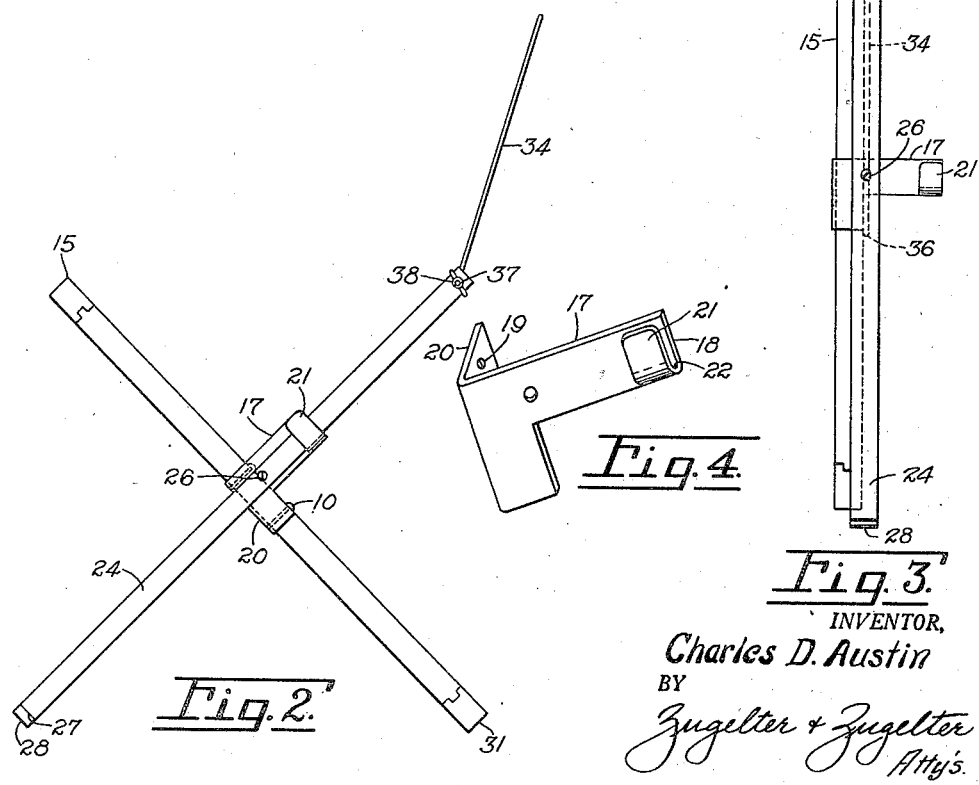
INVENTOR,
Charles D. Austin
BY
Zugelter & Zugelter
Atty's.

April 1, 1947.  C. D. AUSTIN  2,418,286
ARTIST'S SKETCHING EQUIPMENT
Filed Feb. 21, 1945  2 Sheets-Sheet 2
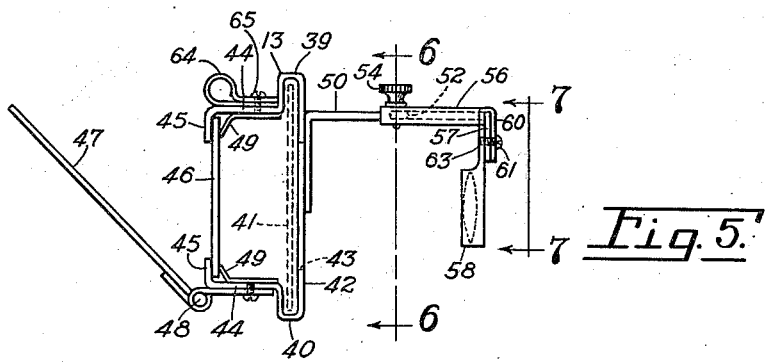
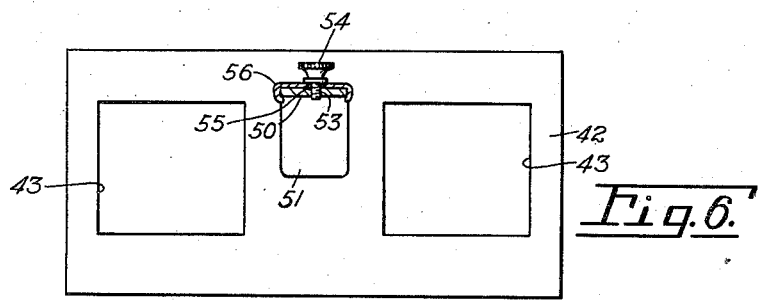
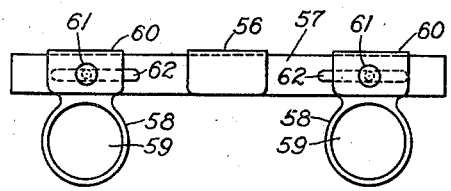
INVENTOR,
Charles D. Austin
BY Zugelter & Zugelter
Atty's.

Patented Apr. 1, 1947

2,418,286

UNITED STATES PATENT OFFICE 2,418,286

ARTIST'S SKETCHING EQUIPMENT

Charles D. Austin, Norwood, Ohio

Application February 21, 1945, Serial No. 579,055

7 Claims. (Cl. 35—26)

The present invention relates to artists' equipment, the purpose of which is to aid in the development of the technique of art students and artists.

An object of the invention is to provide equipment of the character stated, which will enable the artist to enhance his technique inexpensively and expeditiously, particularly under circumstances wherein living or physical models, landscapes, and other subjects may not be available or procurable for one reason or another.

Another object is to provide equipment of the kind referred to, which affords the artist various advantages in the development of his technique, by means of stereoscopic subjects conveniently presented to view at the drawing board and always in substantially the line of sight of the artist as he works.

Another object is to furnish the artist with stereoscopic subjects in such a manner and under such conditions, as to provide a highly acceptable alternative for actual subjects of any character.

Another object is to provide a device for the purposes stated, which is inexpensive, durable, and convenient to use by reason of its collapsibility feature, its simplicity, and its lightness of weight.

The foregoing and other objects are attained by the means described herein and illustrated in the accompanying drawings, in which:

Fig. 1 is a perspective view of the device of the invention, showing the mode of usage thereof.

Fig. 2 is a side elevational view of the device in the extended or use position, the stereoscopic assembly being omitted.

Fig. 3 is a side elevational view of the device of Fig. 2, in the collapsed or inoperative condition.

Fig. 4 is a detail view showing in perspective a bracket of the supporting frame.

Fig. 5 is a side elevational view of the stereoscopic assembly, partly shown in Fig. 1.

Fig. 6 is a cross-sectional view taken on line 6—6 of Fig. 5.

Fig. 7 is a fragmental front elevational view taken on line 7—7 of Fig. 5, showing the lens mount of the stereoscopic assembly.

Common practice in the training and development of artists and art students, has been to poise a subject in nature at an appropriate distance before the artist, and have him sketch the subject upon paper or other sheet material supported upon the customary drawing board. In most cases, the subject in physical form had to be available for sketching, and in many instances the instructor or the artist encountered considerable difficulty in the selection and maintenance of desired subjects. The difficulty was very pronounced in the case of subjects predisposed to change position or expression, as in the case of living models, landscapes, flowering plants and the like. Moreover, the artist sometimes experienced great difficulty in procuring satisfactory or desirable subjects of art when and where needed, for carrying on his work or training. These and other difficulties and disadvantages are familiar to the artist and the art student, wherefore they need not be here specified in detail.

As related in the objects at the head of this description, one purpose of the present invention is to afford the artist at any time and place, the type of art subjects he requires or desires, by means of a stereoscope advantageously related to the drawing board and to the artist's normal line of vision. The arrangement, to be now described, possesses various advantages and desirable features which may best be explained and understood after attaining a thorough understanding of the apparatus herein disclosed.

Referring to Fig. 1 of the accompanying drawing, there is illustrated an artist engaged in making a sketch 12 of an image seen by the artist upon a stereographic transparency supported within the stereoscopic housing 13. The character 14 is intended to represent the image seen by the artist, as if the subject were located before the artist while producing the sketch. Actually, of course, the representation indicated at 14 does not exist, although to the eye of the artist the image appears to be located as illustrated. From the foregoing it will be understood that the artist sketches an image which apparently is before him in life size proportion, and preferably in color. The stereoscopic image may be that of any art subject, and will be three-dimensional in character, as of course.

In accordance with the invention, the stereoscope is to be supported in definite relationship to the drawing board 15 and the sight line of the artist, the structure preferably being collapsible to a substantial flat condition as illustrated by Fig. 3. The drawing board accordingly is provided at its opposite side edges 16, with a pair of brackets 17, one of which is shown in detail in Fig. 4. Each bracket may comprise an arm 18 extended perpendicularly and forwardly of the working face of the drawing board, said brackets being attachable to the rear face of the board by means of screws or other fasteners 10 passing through apertures such as 19 in the angular leg 20 of each bracket. At the free end of arm 18, a lug 21 may be formed for the purpose of providing a pocket having a base portion 22 to support a side member of a main support frame 23. The side members, indicated at 24 and 25, are each pivoted upon a bracket by means of a bolt or other fastener 26.

The main support frame 23 preferably is a single length of strap material, preferably metal, bent to substantially U-shape with the side members 24 and 25 spaced apart, by means of a connecting portion 27, a distance approximating the width of the drawing board. At a location midway between the ends of the connecting portion 27, the frame may have an offset 28 formed therein to furnish a single point of contact for the frame upon the table or other support 29.

The pivotal mountings 26 for the side members of the main frame are located at a distance from the connecting portion 27, such that the connecting portion may clear the lower edge 31 of the drawing board when the frame is swung to the collapsed position of Fig. 3. That is to say, the distance from pivot 26 to the corner 30 of the drawing board, is slightly less than the distance from the pivot to the connecting member 27 of the frame. The frame may thereby rest in substantial parallelism with the plane of the drawing board when the structure is collapsed (Fig. 3).

The free upper end 32 of each frame side member is adapted to swingingly support an inverted U-shaped secondary frame member 33, the purpose of which is to adjustably support the stereoscope 13. The secondary frame is constituted of a pair of side members 34—35 held in spaced parallel relationship by means of the connecting portion 36, the distance between members 34 and 35 being slightly less than the distance between the free ends of the main frame members 24 and 25. The free ends of the secondary frame members are connected to the free ends of the main frame side members, preferably by means of a frictional holding device 37, so that the secondary frame may be swung along an arc, about the connecting means 37, and maintained in any desired position of adjustment. Although the frictional device 37 may be of any known type, it is illustrated herein as a thumb nut 38 screwed onto the outwardly bent and threaded lower end of a secondary frame member 34. By means of the thumb nut, the secondary frame may be clamped and held so as to support the stereoscope in proper relationship to the eyes of the artist. It may be noted that the pivotal friction devices are preferably located upon the main frame side members at a distance from the pivots 26, approximating the distance from said pivots to the upper edge of the drawing board. While this relationship of parts is not essential, it is nevertheless conducive to compactness of the structure when collapsed to the Fig. 3 position. In the collapsed condition of the device, the connecting member 36 of the secondary frame, with the stereoscope 13 supported thereon, may rest substantially flatwise upon the working face of the drawing board. For shipping purposes, however, the stereoscope may be detached from the connecting member 36, in which case the secondary frame will rest flatwise against the drawing board.

The stereoscope as herein disclosed comprises the body 13 of metal or other suitable sheet material bent upon itself at the locations 39 and 40 to provide opposed U-shaped channels for the reception of stereographic transparency slides indicated at 41. The forward face plate 42 of the device may be apertured as at 43 to provide openings which frame the stereographic pictures of the slide. A pair of rearwardly extended arms 44 may be turned inwardly toward one another to provide flanges 45 against which may rest a light diffusing sheet 46. Sheet 46 may be a plate or film of glass, cellulose, or other suitable material having its surface ground or otherwise suitably treated for diffusing light projected thereon by means of an adjustable reflector 47. The reflector 47 may be a polished or mirrored plate hinged as at 48 upon one of the housing arms 44, for adjustment of its angularity to the light diffusing sheet 46. The light diffusing sheet may be held in contact with the flanges 45 by means of resilient holders 49 fixed to the inner faces of arms 44.

The body of the stereoscope will preferably carry a bracket 50 extending forwardly of face 42, midway between the viewing apertures 43—43, for adjustably supporting a lens mounting. The base 51 of the bracket may be spot welded or otherwise suitably fixed to face 42. Near its free end 52, the bracket member 50 may be furnished with a threaded aperture 53 to receive the threaded end of a clamping screw 54, said screw passing through an elongated slot 55 formed in a telescopic slide 56 which carries the lens assembly. The forward end of slide 56 carries a transverse cross bar 57 and supports it in spaced parallelism with the forward face 42 of the stereoscope housing. The cross bar is adapted to support a pair of lens frames 58 containing the double convex lenses 59. In order to accommodate the lenses to the eyes of the user, an adjustable mounting for each lens is required, and such adjustable mountings may be effected simply and conveniently by furnishing each lens frame with an inverted U-shaped hanger 60 adapted to embrace the cross bar for sliding movement lengthwise of the latter. To fix the lens frames to the cross bar, each hanger may be provided with a screw 61 adapted to pass through an elongated slot 62 of the cross bar, and engage a threaded aperture 63 formed in one of the arms of the hanger. It will be understood, of course, that various other forms of adjusting means might be furnished to establish proper disposition of the lenses relative to the cross bar.

From the foregoing, it should be apparent that the lenses may be adjusted as to their focal distance from the stereographic transparency slide, and also to accommodate the pupillary distance between the eyes of the user. The entire stereoscope assembly may be supported upon the secondary frame member 36 in any suitable manner. As herein disclosed by way of example, the suspension may be effected by means of a contractible hinge eye 64 which as shown in Fig. 1 is adapted to frictionally embrace the connecting member 36 of the secondary frame. An adjusting screw 65 may be provided, if desired, for adjusting the force with which the eye grasps the connecting member 36, in order that the stereoscope may be adjusted along an arc about the connecting member to suit the requirements of the user.

The device of the invention as above described, possesses many advantages and improvements to assist in the training and development of artists. It eliminates the need for actual models and other physical subjects, while at the same time bringing to the artist any desired subject in three-dimensional form, either with or without natural colors. The stereoscopic attachment enables the artist to view a subject just as effectively as if the subject were poised before him, but with the added advantage that the subject will never move or change expression while undergoing sketching. The device is particularly effective for the sketching of landscapes which are characterized by unusual cloud and sunset effects, for example, due to the fact that the subject landscape may not change while the artist is sketching it. In the sketching, drawing, or painting of living models, decided advantages are obtained with the use of the present device, for the reason that the subject reproduced upon the stereographic prints cannot change expression or position while the sketch is undergoing completion. The range of subjects that may be brought to the artist by means of the present invention is infinite in number, and may be made available to the artist whenever and wherever any specified subject is desired.

In conclusion, attention is directed to the fact that the housing of the stereoscope does not substantially exceed in its horizontal dimension, the distance between the eyes of the user, this being a feature of considerable advantage in that the eyes of the user may view simultaneously the image of the stereoscope, and objects within the studio, thereby enabling a comparison to be made between the image and surrounding objects, for properly gauging the size and proportions of the subject being sketched, painted or drawn. In this connection, it is to be noted particularly that no hood or housing for the exclusion of light is to be provided within the space between the lens frames and the eyes of the user.

While the equipment herein described is primarily intended for studying art, it is further pointed out that the present invention is useful for teaching or studying other subjects wherein it may be necessary or desirable to apparently poise three dimensional subjects and to support text books or other objects in convenient position relative to the line of sight of the user.

In this connection the drawing board might be used as a writing desk or support for text books, charts, diagrams or other data pertaining to the third dimensional subject in the stereoscope. By this means the user is able to compare, analyze and study the subject in three dimensional form.

The term "drawing board" is used herein in the broad sense, to include any work panel, sheet, or frame suitable for supporting such items or objects as are above referred to, as well as drawing sheets, painting canvas or sheets, and the like. The terms "sketching," "drawing," and "painting" are used synonymously herein.

What is claimed is:

1. Apparatus of the class described comprising in combination, an artist's work panel, a stereoscope including a stereoscopic pair of pictures to furnish a drawing subject in three-dimensional form, and means adjustably supporting the stereoscope relative to the work panel approximately at sight level.

2. Apparatus of the class described comprising in combination, an artist's work panel, a stereoscope including a pair of lenses and a stereoscopic pair of pictures to furnish a drawing subject in three-dimensional form, the pictures of the stereoscope being at a distance from the lenses, with the space about them unobstructed, whereby the artist may view the pictures and surrounding objects simultaneously, to gain proportional advantages while viewing the picture subject, and means adjustably supporting the stereoscope in position to apparently poise the subject at the approximate location in space that a similar physical subject would occupy, with relation to the artist's normal line of sight while sketching the subject upon the work panel.

3. Apparatus of the class described comprising in combination, an artist's drawing board, a stereoscope including a pair of lenses and a stereoscopic pair of pictures to furnish a drawing subject in three-dimensional form, the pictures of the stereoscope being at a distance from the lenses, with the space about them unobstructed, whereby the artist may view the pictures and surrounding objects simultaneously, to gain proportional advantages while viewing the picture subject, and means adjustably supporting the stereoscope in position to apparently poise the subject at the approximate location in space that a similar physical subject would occupy, with relation to the artist's normal line of sight while sketching the subject, said supporting means comprising an easel mounting both the drawing board and the stereoscope.

4. Apparatus of the class described comprising in combination, an artist's drawing board, a stereoscope including a stereoscopic pair of pictures to furnish a drawing subject in three-dimensional form, an easel structure to support the drawing board at an inclination, and an adjustable mounting means on the easel to support the stereoscope at various positions approximating sight level.

5. Apparatus of the class described comprising in combination, an artist's drawing board, a stereoscope including a stereoscopic pair of pictures to furnish a drawing subject in three-dimensional form, an easel structure to support the drawing board at an inclination, and an adjustable mounting means on the easel to support the stereoscope at various positions approximating sight level, the easel structure and the mounting means for the stereoscope being collapsible to substantial parallelism with the plane of the drawing board.

6. A collapsible apparatus of the class described comprising in combination, an artist's drawing board having substantially parallel side edges and a lower edge, a substantially U-shaped main support frame including upwardly inclined arms embracing the opposite side edges of the drawing board, means pivoting said frame arms to the sides of the drawing board with the free ends of the arms disposed above and forwardly thereof, an inverted U-shaped secondary frame including spaced arms and a connecting member, the spaced arms having free ends, and means pivoting the free ends of said arms to the free ends of the main frame arms, a stereoscope, and means pivotally mounting the stereoscope upon the connecting member of the secondary frame.

7. An instruction device of the class described comprising in combination, a stereoscope including a pair of lenses, and a stereoscopic pair of pictures to furnish a drawing subject in three-dimensional form, the pictures of the stereoscope being at a distance from the lenses with the space about the lenses and the pictures unobstructed, whereby an artist simultaneously may view the pictures and surrounding objects beyond the pictures to gain proportional advantages while viewing the picture subject, and adjustable means supported remotely from the drawing area immediately before the artist, for mounting the stereoscope in a stationary position corresponding to the normal substantially horizontal line of vision of the artist, to apparently poise the subject at the approximate location in space that a similar actual subject would occupy with relation to the artist's normal line of sight while sketching the subject.

CHARLES D. AUSTIN.

REFERENCES CITED

The following references are of record in the file of this patent:

UNITED STATES PATENTS

| Number | Name | Date |
| --- | --- | --- |
| 2,104,778 | Talley | Jan. 11, 1938 |
| 216,460 | Bosquist | June 10, 1879 |
| 1,390,938 | Thompson | Sept. 13, 1921 |
| 2,370,143 | Buckmaster | Feb. 27, 1945 |
| 1,533,437 | Macey | Apr. 14, 1925 |
| 490,159 | McFarland | Jan. 17, 1893 |